May 1, 1951  A. E. BRICKMAN  2,550,669
FLEXIBLE CONDUIT
Filed Dec. 27, 1948
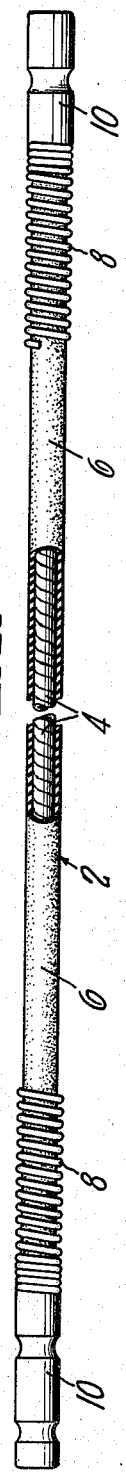
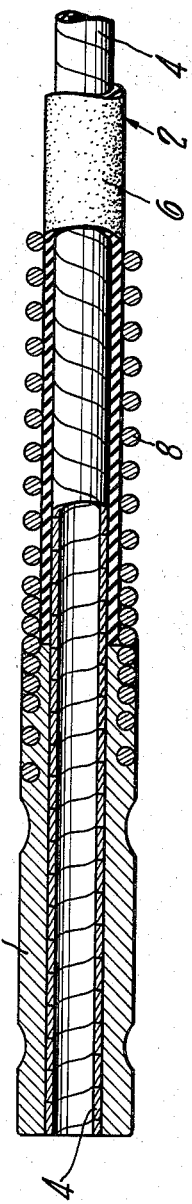
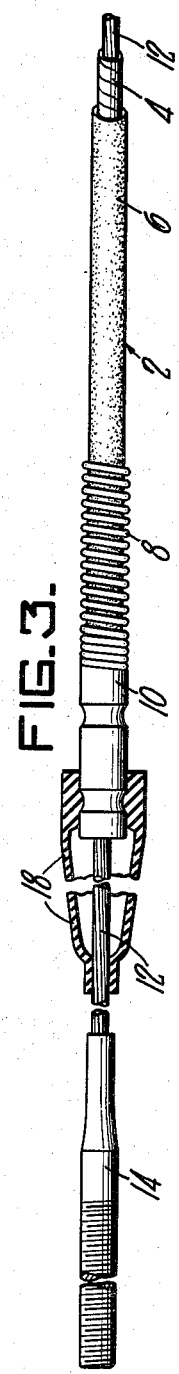
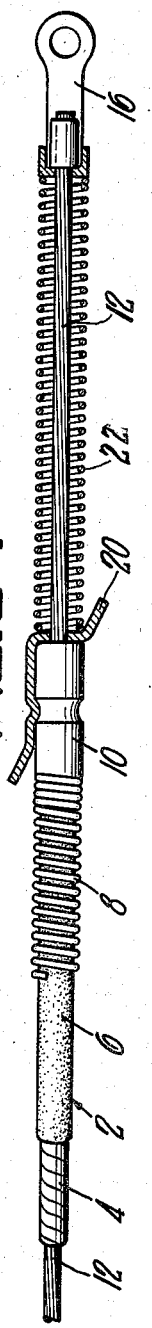
FIG.1.
FIG.2.
FIG.3.
FIG.3ª.
Inventor:
ALAN E. BRICKMAN,
by: Donald G. Dalton
his Attorney.

Patented May 1, 1951

2,550,669

UNITED STATES PATENT OFFICE 2,550,669

FLEXIBLE CONDUIT

Alan E. Brickman, Worcester, Mass., assignor to The American Steel and Wire Company of New Jersey, a corporation of New Jersey Application December 27, 1948, Serial No. 67,489

4 Claims. (Cl. 138—58)

This invention relates to a flexible conduit and more particularly to flexible conduits for brake control cables. Various types of conduits have been provided for this purpose. For example, the patents to Brickman Nos. 2,046,545 and 2,074,770 disclose similar conduits and the patent to Brickman No. 2,092,830 discloses the use of such conduits with brake controls. These conduits have fittings at the end thereof and the conduits tend to fail due to fatigue at the point that the fittings are joined to the conduit.

It is therefore an object of my invention to provide a conduit having increased fatigue strength at the joint between the fitting and conduit.

This and other objects will be more apparent after referring to the following specification and attached drawings, in which:

Figure 1 is a view, partly in section, of the conduit of my invention;

Figure 2 is an enlarged sectional view of the terminal fitting fastened to the conduit; and Figures 3 and 3a when taken together show a brake cable assembly embodying my invention.

Referring more particularly to the drawings, the reference numeral 2 indicates the flexible conduit of my invention. In making the conduit, a flat hard rolled wire 4 is spirally wound to provide a hollow member or tube through which the brake cable passes. A jacket 6 is then extruded or strip insulated on the member 4 in the usual manner. This jacket may be made of rubber, neoprene, nylon or other flexible thermoplastic material. The rubber covering 6 is then stripped away from the end of the conduit and helically wound coil spring 8 is placed over a portion of the rubber covering 6 and also over the bared portion of the conduit as shown in Figure 2. A fitting 10 is then die cast over the bared portion of the tube and over that part of the spring 8 which extends around the bared portion. It will be noted that the coils of the spring are closely spaced at the point where the fitting 10 abuts the covering 6. The spring 8 extending from the die cast terminal fitting 10 along the outside of the rubber covered conduit serves as a vibration damper, thus greatly increasing the fatigue strength of the conduit. A similar fitting is provided at the opposite end of the conduit.

Figures 3 and 3a show a brake cable 12 passing through the conduit 2. The cable 12 is provided with a threaded fitting 14 at one end thereof connected to actuating mechanism (not shown) and a fitting 16 at the opposite end thereof connected to the brake. A rubber sleeve 18 is fastened to the fitting 16 adjacent the fitting 14 and closely surrounds the cable 12 to provide a shield for excluding dirt and the like. Fastened to the other fitting 16 is a bracket 20 which is attached to the brake drum (not shown). A spring 22 surrounds the cable 12 between the fitting 16 and bracket 20. The spring 22 is compressed when tension is applied to the cable 12 and forces the cable 12 in the opposite direction when tension is released.

While one embodiment of my invention has been shown and described it will be apparent that other adaptations and modifications may be made without departing from the scope of the following claims.

I claim:

1. A flexible conduit comprising a metallic core, a flexible jacket surrounding said metallic core for a portion of its length, a cast metallic fitting surrounding the end of said metallic core, and a coil spring surrounding the flexible jacket adjacent the fitting with one end of the spring being embedded in the fitting, the embedded coils of said spring being radially spaced from said metallic core with the metal of said fitting extending under and around said embedded coils.

2. A flexible conduit according to claim 1 in which the coils of the spring are closely spaced at the point where the fitting abuts the flexible jacket.

3. A flexible conduit comprising a spirally wound metallic core, a flexible jacket surrounding said metallic core for a portion of its length, a cast metallic fitting surrounding each end of said metallic core, and a coil spring surrounding the flexible jacket adjacent each fitting with one end of the spring being embedded in the fitting, the embedded coils of said spring being radially spaced from said metallic core with the metal of said fitting extending under and around said embedded coils.

4. A flexible conduit according to claim 3 in which the coils of the springs are closely spaced at the point where the fitting abuts the flexible jacket.

ALAN E. BRICKMAN.

REFERENCES CITED

The following references are of record in the file of this patent:

UNITED STATES PATENTS

| Number | Name | Date |
|---|---|---|
| 701,272 | Neil | May 27, 1902 |
| 1,782,447 | Scranton | Nov. 25, 1930 |
| 1,812,646 | Burd | June 30, 1931 |
| 1,819,243 | Hubbard | Aug. 18, 1931 |
| 1,855,340 | Damon | Apr. 26, 1932 |
| 2,074,770 | Brickman et al. | Mar. 23, 1937 |
| 2,092,830 | Brickman et al. | Sept. 14, 1937 |
| 2,286,759 | Patnode | June 16, 1942 |